US008171543B2

(12) United States Patent
Jeganathan et al.

(10) Patent No.: US 8,171,543 B2
(45) Date of Patent: May 1, 2012

(54) ELECTRONIC TRIP UNITS WITH LIMITED READ/WRITE ACCESS

(75) Inventors: Srinivasan Jeganathan, Tamilnadu (IN); Arun Kumar Singh, Farrukhabad (IN)

(73) Assignee: General Electric Company, Schenectady, NY (US)

( * ) Notice: Subject to any disclaimer, the term of this patent is extended or adjusted under 35 U.S.C. 154(b) by 861 days.

(21) Appl. No.: 11/847,010

(22) Filed: Aug. 29, 2007

(65) Prior Publication Data

US 2009/0064319 A1    Mar. 5, 2009

(51) Int. Cl.
*G06F 7/04* (2006.01)
*G06F 21/00* (2006.01)
*G08B 29/02* (2006.01)
*G01P 5/00* (2006.01)
*G01C 21/00* (2006.01)

(52) U.S. Cl. .............. 726/19; 726/17; 726/34; 713/183; 116/62.1; 377/24.1

(58) Field of Classification Search .................... 726/19, 726/17, 34; 713/183; 116/62.1; 377/24.1
See application file for complete search history.

(56) References Cited

U.S. PATENT DOCUMENTS

| 4,945,443 | A | * | 7/1990 | DeBiasi et al. | ............... 361/93.1 |
| 5,943,201 | A | * | 8/1999 | Walker et al. | .................... 361/64 |
| 7,302,581 | B2 | * | 11/2007 | Utsumi et al. | ................ 713/183 |
| 2002/0099517 | A1 | * | 7/2002 | Brendon et al. | ............... 702/165 |

* cited by examiner

*Primary Examiner* — Aravind Moorthy
(74) *Attorney, Agent, or Firm* — Cantor Colburn LLP

(57) ABSTRACT

A method of limiting read/write access of information stored on an electronic trip unit is disclosed. The method includes requesting a valid password on one of a communication port of the electronic trip unit and a display device of the electronic trip unit, receiving a password at a processor of the electronic trip unit in response to the request, determining if the received password is valid based on password information stored on a memory of the electronic trip unit, and limiting read/write access of information stored on the electronic trip unit based on the determination.

16 Claims, 8 Drawing Sheets

ELECTRONIC TRIP UNITS WITH LIMITED READ/WRITE ACCESS

BACKGROUND OF THE INVENTION

Embodiments of the invention generally relate to electronic trip units, and more particularly to limitation of read/write access to information stored on electronic trip units.

Circuit breakers may be used in industrial, commercial, and residential applications for protecting electrical devices from over-current situations. Circuit breakers may be used as a replacement for conventional fuses, although some circuit breakers function slower than fuses, and may include complicated mechanical components. Further, time-delay and other advanced fusing techniques may be complicated to implement in the mechanical components of typical circuit breakers. Solid-state trip units, or electronic trip units, have been included in circuit breakers for some advanced functionality. For example, electronic trip units may perform functions such as adjustable instantaneous tripping, adjustable delayed tripping, and may provide increased flexibility if compared to typical stand-alone circuit breakers.

However, settings for advanced functionality (for example, sensitivity, time delay, etc.) provided by conventional electronic trip units are user-adjustable. Further, both technically apt and in-apt personnel may have access to these user-adjustable settings. Adjustment of the settings may be necessary to detect fault conditions or issues with operation of the electronic trip unit. Additionally, it may be necessary to periodically monitor the settings, or gain access to performance related data stored on the electronic trip unit. However, the settings and/or data may be proprietary or protected information, and it may be desirable to limit access to these settings and/or data.

Conventionally, protective casings have been employed to limit access to electronic trip units. For example in FIG. 1, a conventional electronic trip unit 1 with protective casing 2 is illustrated. As shown, the protective casing 2 may include a hinge 4 and locking device 3. To limit access to the electronic trip unit 1, the locking device 3 may include a key-slot or other locking mechanism needing a valid key. Only a valid key may be used to open the protective casing 2, and therefore, only personnel with the valid key may access user-adjustable settings on the electronic trip unit 1.

Figure 1:
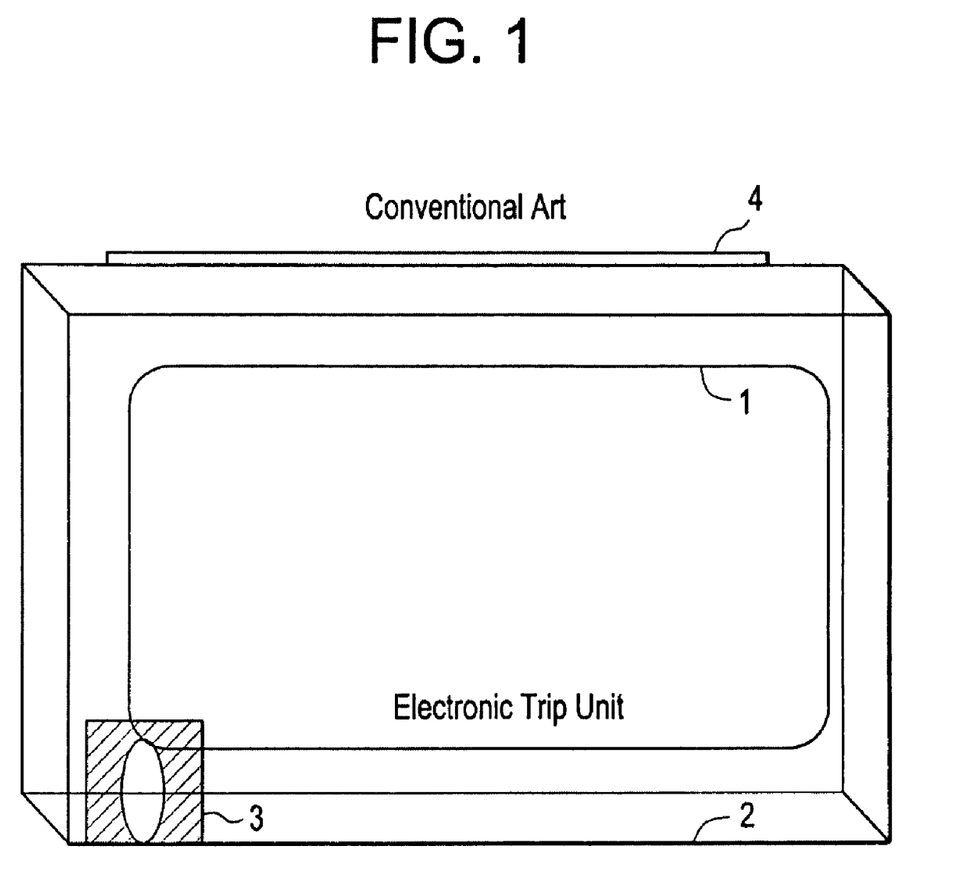
FIG. 1 is a diagram of a conventional electronic trip unit protection apparatus.

However, it is appreciated that the protective casing 2 may be broken, or altered, to allow access to the electronic trip unit by anyone. Further, if the valid key is lost or misplaced even authorized personnel may have difficulty accessing the user-adjustable settings of the electronic trip unit 1 or other information stored thereon. Therefore, read/write access to conventional electronic trip units may be unlimited.

Accordingly, example embodiments of the present invention may provide read/write access limitation of electronic trip units to overcome these drawbacks.

BRIEF DESCRIPTION OF THE INVENTION

An embodiment of the invention includes a method of limiting read/write access of information stored on an electronic trip unit. The method includes requesting a valid password on one of a communication interface of the electronic trip unit and a display device of the electronic trip unit, receiving a password at a processor of the electronic trip unit in response to the request, determining if the received password is valid based on password information stored on a memory of the electronic trip unit, and limiting read/write access of information stored on the electronic trip unit based on the determination.

Another embodiment of the invention includes a method of limiting read/write access of information stored on an electronic trip unit. The method may include transmitting a password to an electronic trip unit over a communication interface of the electronic trip unit, receiving information identifying whether the transmitted password is a valid password from the electronic trip unit, and performing one of read/write access to the information stored on the electronic trip unit and indicating lack of read/write access based on the received information.

Another embodiment of the invention includes an electronic trip unit with limited read/write access to information stored thereon. The electronic trip unit includes a processor to process read/write access requests, a communication interface operatively connected to the processor to receive the read/write access requests, and a memory operatively connected to the processor to store password information. According to the embodiment, the requests include transmission of a password to the processor. According to the embodiment, the communication interface is one of a communication port of the electronic trip unit and a display device of the electronic trip unit. According to the embodiment, the password information includes data pertaining to at least one valid password.

BRIEF DESCRIPTION OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION OF THE INVENTION

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
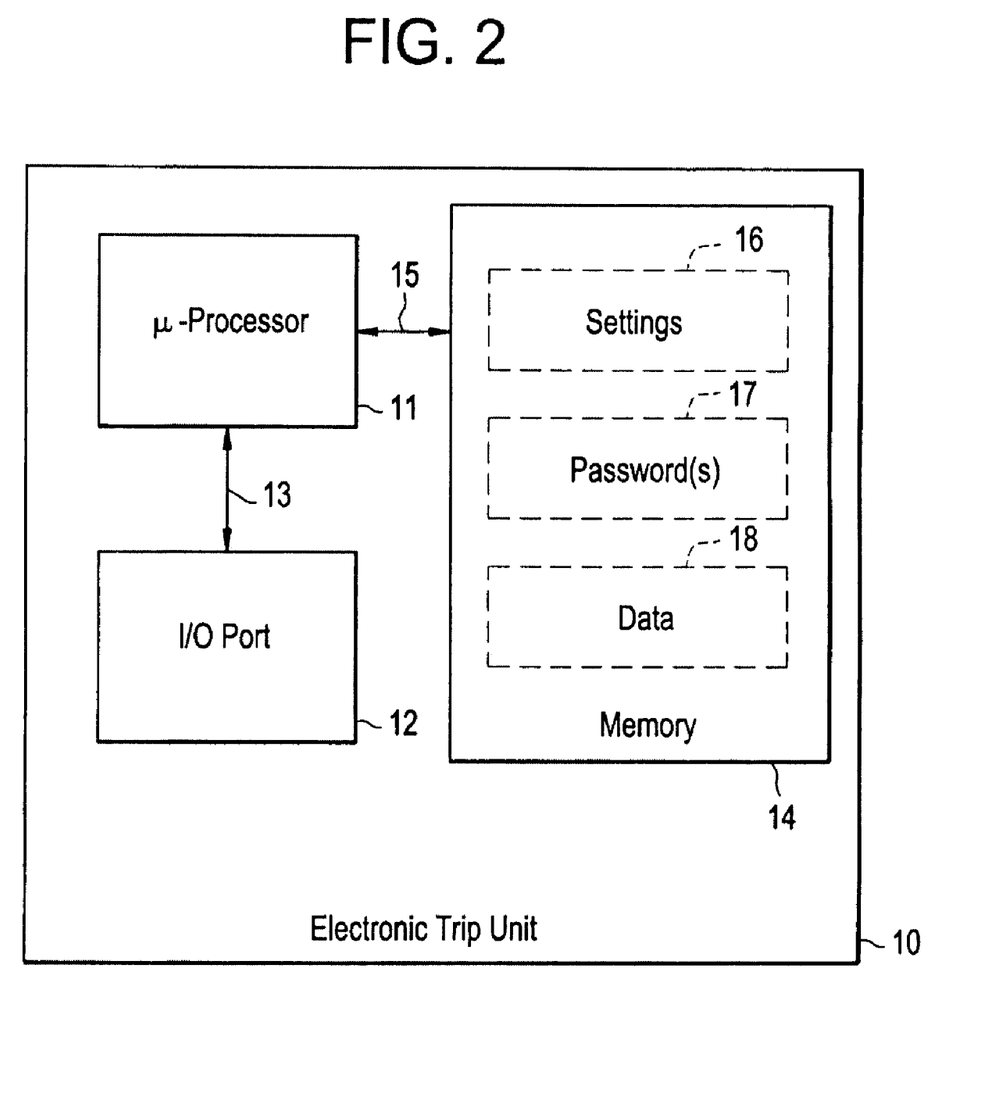
FIG. 2 is a block diagram of an exemplary electronic trip unit, in accordance with an example embodiment of the present invention.

Hereinafter, example embodiments of the present invention will be described in detail. According to example embodiments, methods of limiting read/write access to electronic trip units is disclosed. Similarly, electronic trip units with limited read/write access to information stored thereon are also disclosed. Turning to FIG. 2, an electronic trip unit according to example embodiments of the present invention is illustrated in detail.

FIG. 2 is a block diagram of an exemplary electronic trip unit, in accordance with an example embodiment of the present invention. As illustrated in FIG. 2, the exemplary electronic trip unit 10 includes a microprocessor 11 operatively connected to memory 14 over connection 15. Therefore, microprocessor may both send and receive information to/from memory 14. For example, microprocessor may access information stored on memory 14, process said information, and store the processed information on memory 14.

As further illustrated in FIG. 2, memory 14 may include a plurality of different information. The information may include settings 16, password(s) 17, and data 18. Alternatively, memory 14 may be divided into different portions for storing a plurality of different types of information. For example, memory 14 may include a portion 16 for storing settings, a portion 17 for storing a password(s), and a portion 18 for storing data. Further detail regarding the different types of information is described hereinafter.

Settings 16 may be a portion on memory 14, or information on memory 14, including settings information for the electronic trip unit 10. The settings may include instantaneous trip settings, delayed trip settings, over-current level settings, timed over-current level settings, or other such settings pertaining to operation of the electronic trip unit 10.

Password(s) 17 may be a portion on memory 14, or information on memory 14, including password information for the electronic trip unit 10. The password information may include a valid password or a plurality of valid passwords. In at least one example embodiment, the password information includes at least one password for read/write access to the electronic trip unit 10. The at least one password, if entered in the electronic trip unit 10, may allow read/write access to information stored on memory 14.

In another example embodiment, the password information includes at least two passwords. The at least two passwords are abstracted into different access levels. For example, a first of the at least two passwords, if entered in the electronic trip unit 10, may allow limited read/write access to information stored on memory 14. The limited read/write access may include only the ability to read certain information, only the ability to write certain information, or any combination thereof. Further, according to this example, a second of the at least two passwords may allow unlimited read/write access to information stored on memory 14. The unlimited read/write access may include the ability to read or write to any information stored on memory 14. Moreover, although this example has been shown to include only two passwords or password access levels, it should be understood that any number of passwords or access levels including a plurality of different read/write access combinations are intended to be within the scope of example embodiments. For example, in at least one example embodiment, an administrative password may be employed to override and grant unlimited access to electronic trip units of example embodiments. Exhaustive description of the combinations of read/write access password combinations will be omitted herein for the sake of brevity.

Data 18 may be a portion on memory 14, or information stored on memory 14, including data related to the electronic trip unit. For example, data 18 may include performance related data, historical data, or similar data pertaining to the electronic trip unit. Examples may include the number of times the electronic trip unit has tripped, current levels during trips, average current levels, minimum current levels, maximum current levels, and/or other such data.

Turning back to FIG. 2, I/O port 12 is illustrated as being operatively connected to microprocessor 11 over connection 13. I/O port 12 may be any input-output port allowing a user or device to send information to the microprocessor 11. For example, I/O port 12 may include pushbutton device ports, serial communication ports, and/or other ports for sending information to microprocessor 11. Therefore, information submitted on I/O port 12 may be accessed by the microprocessor 11.

Although not illustrated, it is understood that microprocessor 11 is capable of executing computer executable code and processing a plurality of information. Further, microprocessor may include a plurality of different connections not illustrated in FIG. 2. For example, microprocessor 11 may control a display device, or may communicate with a display controller to provide the capability of displaying information on a display device. Hereinafter, a more detailed description of the arrangement of an exemplary electronic trip unit is given with reference to FIGS. 3-5, which are in pictorial form.

Figure 3:
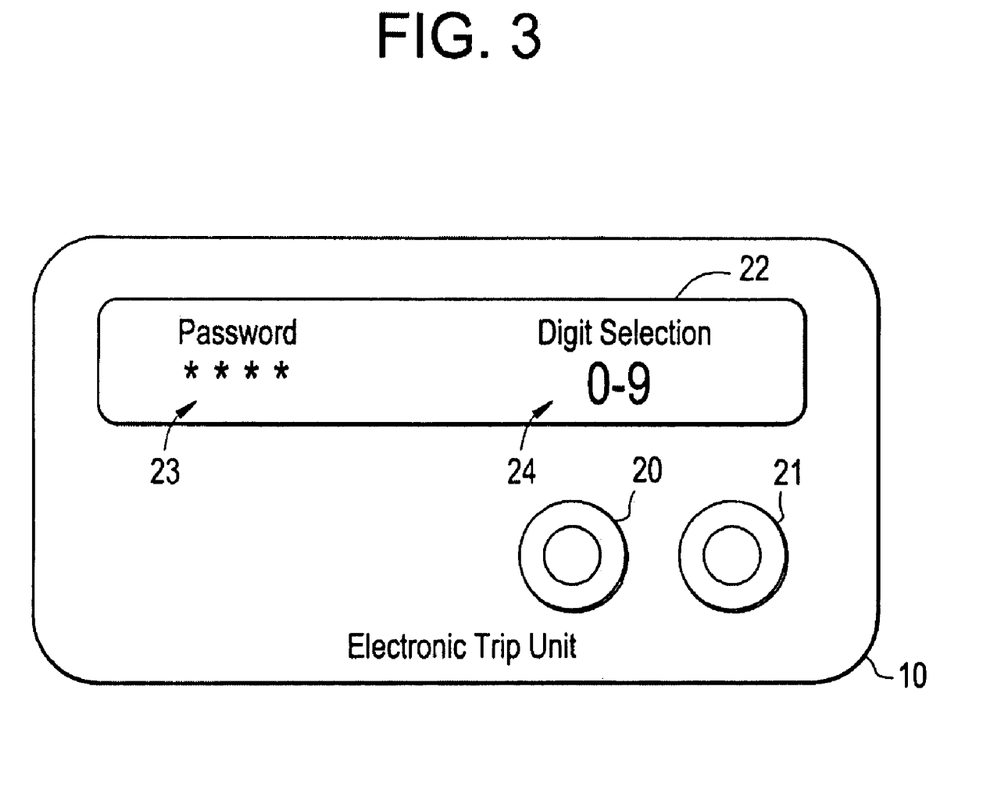
FIG. 3 is a pictorial diagram of an exemplary electronic trip unit, in accordance with an example embodiment of the present invention.

FIG. 3 is a pictorial diagram of an exemplary electronic trip unit, in accordance with an example embodiment of the present invention. As illustrated in FIG. 3, electronic trip unit 10 includes pushbutton 20, pushbutton 21, and display device 22. Pushbuttons 20 and 21 may allow a user to select and enter information using display device 22. For example, display device 22 may display a password portion 23 and a digit selection portion 24. Using pushbutton 20, a user may scroll or select a digit displayed on digit selection portion 24. Further, using pushbutton 21 a user may enter the selected digit such that it is represented on the password portion 23. Alternatively, the operations described above may be swapped, such that pushbutton 21 is used to select digits, and pushbutton 20 is used to enter digits. Through entering a valid password using pushbuttons 20 and 21, a user may gain a level of read/write access to information on the electronic trip unit 10. It is noted that example embodiments should not be limited to employment of a two-button interface. For example, keypads, numeric keypads, alpha-numeric keypads, more buttons, less buttons, and/or touch-screen interfaces are also applicable to example embodiments. Hereinafter, an exemplary representation of read/write access is described with reference to FIG. 4.

Figure 4:
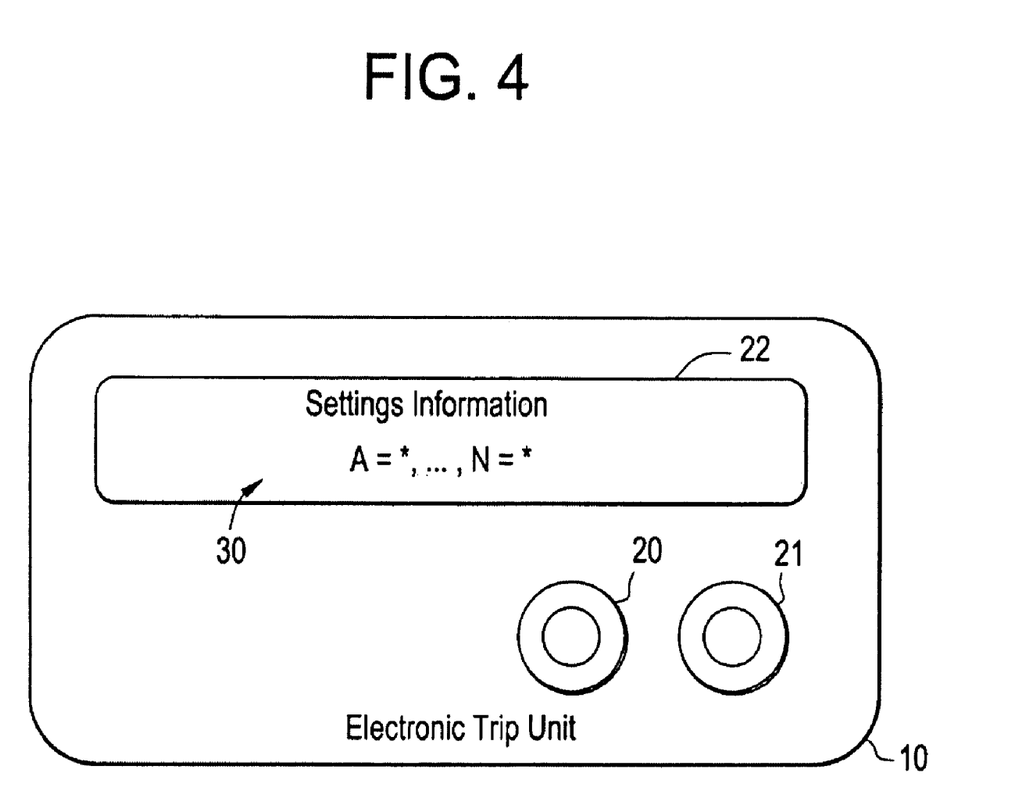
FIG. 4 is a pictorial diagram of an exemplary electronic trip unit, in accordance with an example embodiment of the present invention.

FIG. 4 is a pictorial diagram of an exemplary electronic trip unit, in accordance with an example embodiment of the present invention. As illustrated in FIG. 4, display device 22 may display information 30 stored on the electronic trip unit 10. Further, the information 30 may be altered through use of any of pushbuttons 20 and 21. For example, a user may scroll through different portions of the information 30 using one of pushbuttons 20 and 21. New information may be selected using the pushbuttons as well. Moreover, the new information may be entered using one of the pushbuttons 20 and 21. It should be understood that although only settings information is depicted on display device 22, other information, as described above with reference to FIG. 2, may also be displayed, accessed, and/or altered according to example embodiments. It should also be understood that a keypad or other entry device may also be used to select and/or view information. As noted above in the description of FIG. 2, an I/O port may include a communications interface. Hereinafter, an exemplary electronic trip unit including a user-accessible communications interface (or for example, an I/O port) is described with reference to FIG. 5.

Figure 5:
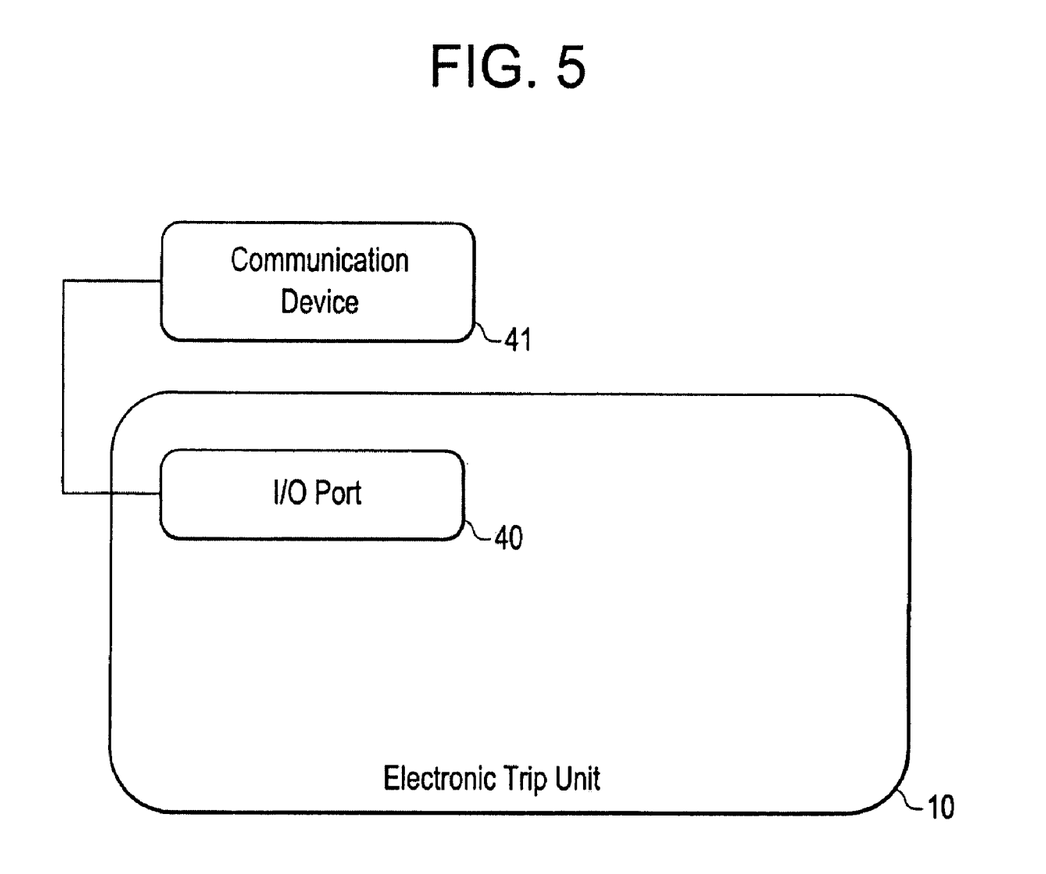
FIG. 5 is a pictorial diagram of an exemplary electronic trip unit, in accordance with an example embodiment of the present invention.

FIG. 5 is a pictorial diagram of an exemplary electronic trip unit, in accordance with an example embodiment of the present invention. As illustrated in FIG. 5, I/O port 40 is accessible on the electronic trip unit 10. The I/O port may be a port operatively connected to I/O port 12 of FIG. 2, may be an extension of I/O port 12, or may be I/O port 12. Therefore, information submitted on I/O port 40 may be accessed by a microprocessor on the electronic trip unit 10. For example, a communication device 41 may be connected to I/O port 40. The communication device 41 may be a computer, laptop, serial communication device, dedicated communication device, and/or any communication device capable of communicating over I/O port 40. The communication device 41 may submit password information on I/O port 40 and receive information from a processor of the electronic trip unit. If valid password information is submitted, the communication device 41 may gain read/write access to information stored on electronic trip unit 10. Therefore, the communication device may read and/or write information on electronic trip unit 10.

It is noted that although FIG. 5 only illustrates I/O port 40 on electronic trip unit 10, a similar configuration to that illustrated in FIG. 4 may also be included. For example, an I/O port, pushbutton(s), keypad, numeric keypad, alpha-numeric keypad, touch-screen, and/or display device may be included on the electronic trip unit 10. Therefore, according to example embodiments, multiple forms of limited read/write access, including access through pushbuttons, keypads, and/or a communication device may be performed.

As described above, exemplary electronic trip units including limited read/write access to information stored thereon have been disclosed. Hereinafter, methods of limiting read/write access according to example embodiments are described more fully with reference to FIGS. 6-8.

Figure 6:
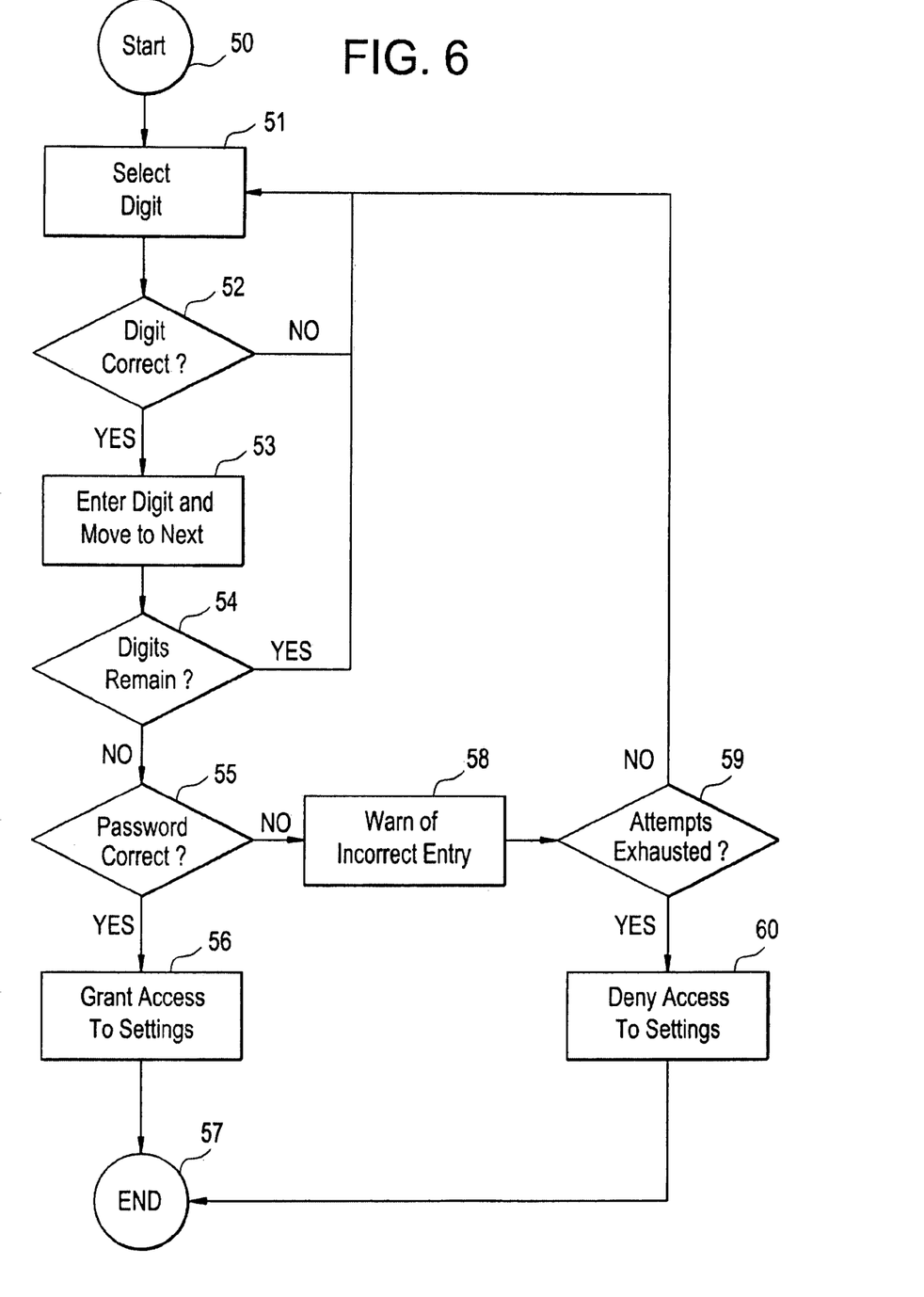
FIG. 6 is a flow chart of a method of limiting read/write access to an electronic trip unit, in accordance with an example embodiment of the present invention.

FIG. 6 is a flow chart of a method of limiting read/write access to an electronic trip unit, in accordance with an example embodiment of the present invention. As illustrated in FIG. 6, a user may select a digit of a password on an electronic trip unit in step 51. Upon determining if the correct digit is entered in step 52, the user may enter the digit and move to the next digit of the password in step 53. Depending upon the number of digits used in the password, the user may select more digits or move to password verification in step 54. If digits remain, the user may select the next digit in step 51. If no digits remain, the user may verify the password in step 55.

If the password is determined as valid in step 55, the user may be granted access to settings and/or information on the electronic trip unit in step 56. Therefore, the user may have read/write access to information stored on the electronic trip unit. Additionally, if multiple levels of access are employed, the user may be granted a level of access according to the entered password. This may be substantially similar to the plurality of passwords/password access level examples described above with reference to FIG. 2.

If the entered password is determined as invalid, the user may be warned of an incorrect password entry in step 58. According to example embodiments, there may be a limited number of entry attempts permitted. Determination of whether entry attempts have been exhausted occurs in step 59. Therefore, if the number of allowed attempts has been exhausted, the user may be denied access to information stored on the electronic trip unit in step 60. For example, an electronic trip unit may allow up to a desired number of attempts before relinquishing password entry options. In at least one example embodiment, the ability to enter a password after relinquishing password entry options due to excessive attempts is governed by either a desired amount of time or overriding with an administrative or high-level password (for example, in some example embodiments, multiple password levels may be employed). Therefore, according to some example embodiments, after relinquishing password entry options, a desired amount of time must lapse or an administrator password must override the relinquishment.

If the number of password entry attempts has not been exhausted, a new password entry may begin in step 51. Therefore, as described above, example embodiments provide methods of limiting read/write access to information stored on electronic trip units.

It is noted that although methods have been described in terms of users entering a password on an electronic trip unit, example embodiments are not so limited. For example, embodiments of the present invention also provide limited read/write access to electronic trip units from communication devices. For example, a communication device may be similar to the devices described above with reference to FIGS. 2 and 5. Hereinafter, methods of limiting read/write access to information stored on electronic trip units is described with reference to FIGS. 7 and 8.

Figure 7:
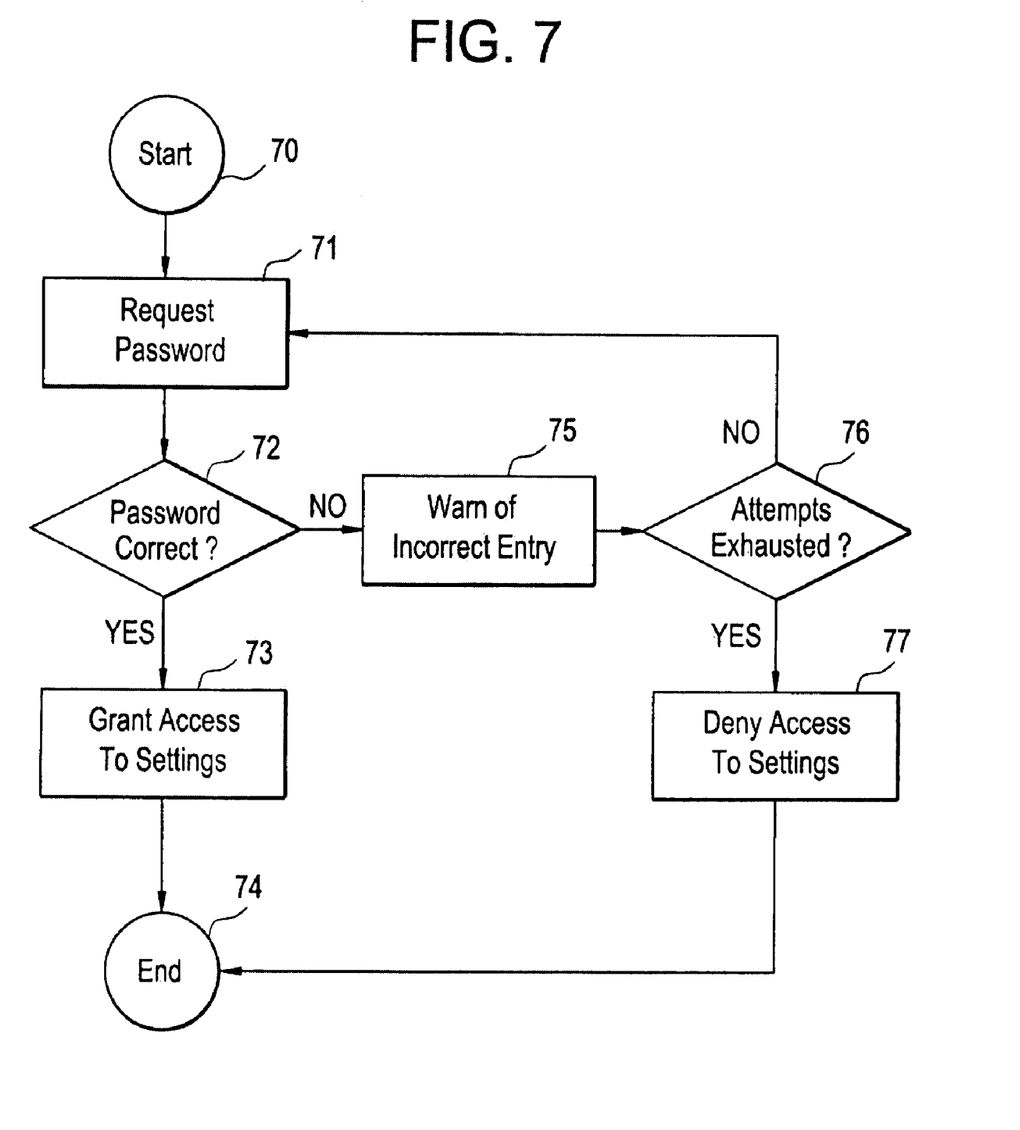
FIG. 7 is a flow chart of a method of limiting read/write access to an electronic trip unit, in accordance with an example embodiment of the present invention.

FIG. 7 is a flow chart of a method of limiting read/write access to an electronic trip unit, in accordance with an example embodiment of the present invention. As illustrated in FIG. 7, an electronic trip unit may prompt a communication device for a password in step 71. The communication device may be in communication with the electronic trip unit over an I/O port, for example, as illustrated in FIGS. 2 and 5. Upon receipt, or alternatively after receipt, of a password, the electronic trip unit may determine if the password is valid in step 72. If the password is valid, the electronic trip unit may grant the communication device read/write access to information stored, on the electronic trip unit in step 73.

If the password is determined as invalid, the communication device may be warned of an incorrect password entry in step 75. For example, an incorrect password flag or message may be sent to the communication device. According to example embodiments, there may be a limited number of password transmission attempts permitted. Therefore, if the number of allowed attempts has been exhausted, the communication device may be denied access to information stored on the electronic trip unit in step 77. For example, an electronic trip unit may allow up to a desired number of attempts before relinquishing password transmission options. Determination if transmission attempts have been exhausted occurs in step 76. In at least one example embodiment, the ability to transmit a password after relinquishing password transmission options due to excessive attempts is governed by either a desired amount of time or overriding with an administrative or high-level password (for example, in some example embodiments, multiple password levels may be employed).

If the number of password transmission attempts has not been exhausted, a new password transmission request may be issued in step 71. Therefore, as described above, example embodiments provide methods of limiting read/write access to information stored on electronic trip units by communication devices.

Figure 8:
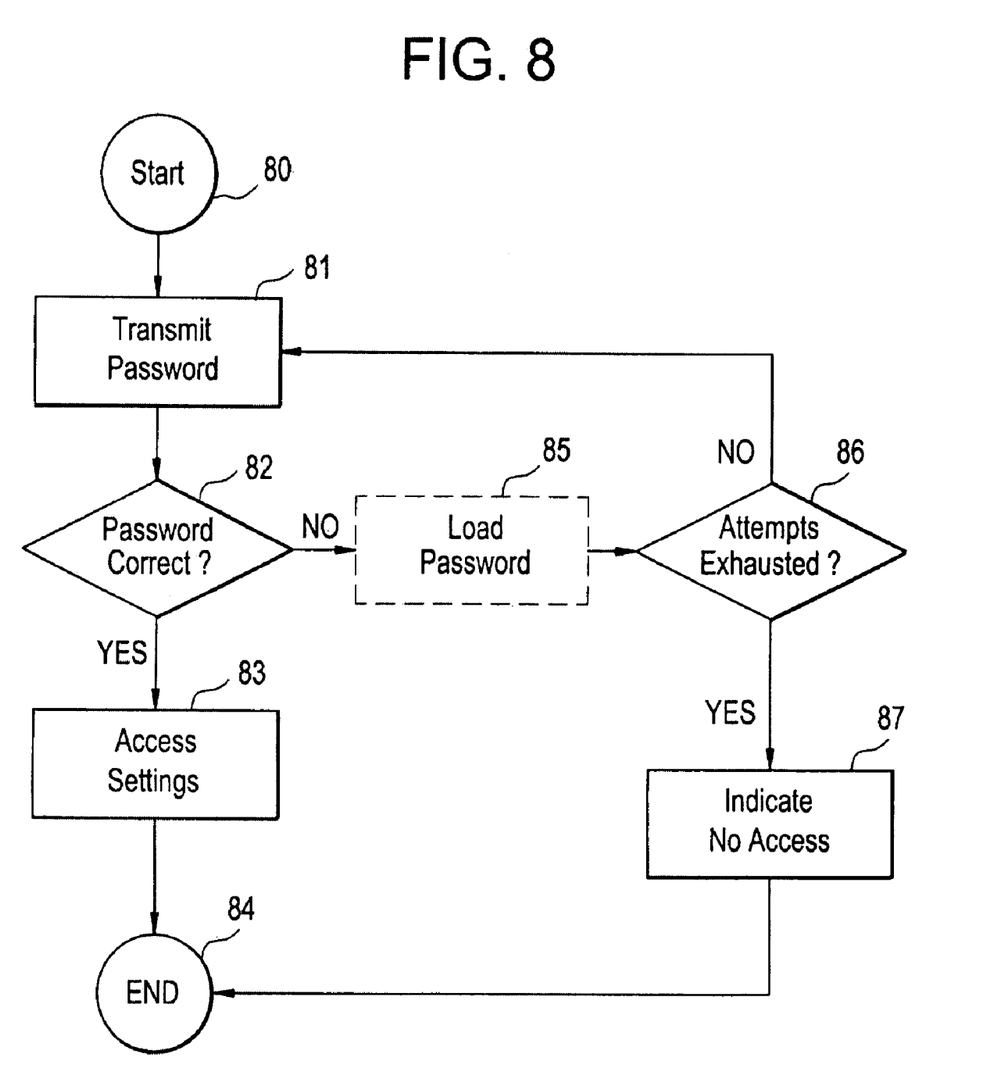
FIG. 8 is a flow chart of a method of limiting read/write access to an electronic trip unit, in accordance with an example embodiment of the present invention.

FIG. 8 is a flow chart of a method of limiting read/write access to an electronic trip unit, in accordance with an example embodiment of the present invention. As illustrated in FIG. 8, a communication device may transmit a password to an electronic trip unit in step 81. If a message or flag is received indicating the transmitted password is valid in step 82, the communication device may access information stored on the electronic trip unit in step 83.

If the transmitted password is invalid, the communication device may attempt to load a new or updated password in step 85. It is noted that step 85 is optional, as the same password may be re-transmitted as well. According to example embodiments, there may be a limited number of password transmission attempts permitted. Therefore, if the number of allowed attempts has been exhausted, the communication device may be denied access to information stored on the electronic trip unit in step 87. For example, an electronic trip unit may allow up to a desired number of attempts before relinquishing password transmission options. Determination if transmission attempts have been exhausted occurs in step 86. In at least one example embodiment, the ability to transmit a password after relinquishing password transmission options due to excessive attempts is governed by either a desired amount of time or overriding with an administrative or high-level password (for example, in some example embodiments, multiple password levels may be employed).

If the number of password transmission attempts has not been exhausted, a new password transmission request may begin in step 81. Therefore, as described above, example embodiments provide methods of limiting read/write access to information stored on electronic trip units by communication devices.

It is noted that in combination with the exemplary electronic trip units and methods described above, additional features or functionality may be included without departing from the scope of example embodiments. For example, after read/write access has been granted, read/write access may be disabled after a desired amount of time has elapsed with inactivity. For example, if a user is granted read/write access to an exemplary electronic trip unit, and subsequently stops communicating with the electronic trip unit, the electronic trip unit may disable read/write access after a period of inactivity and require re-entry of a valid password. Further, more or less pushbuttons, communication interfaces, display devices, may be included, or other such modifications/combinations may be implemented as well, depending upon the particular implementation of example embodiments of the present invention. For example, use of a push-button interface as described hereinbefore should not exclude keypads, numeric keypads, alpha-numeric keypads, one or more pushbuttons, or other suitable modifications.

As described above, example embodiments of the present invention provide methods of limiting read/write access to information stored on electronic trip units. Furthermore, example embodiments of the present invention provide electronic trip units with limited access to information stored thereon. With only some example embodiments of the present invention having thus been described, it will be obvious that the same may be varied in many ways. Such variations are not to be regarded as a departure from the spirit and scope of the present invention, and all such modifications are intended to be included within the scope of the present invention as stated in the following claims.

What is claimed is:

1. A method of limiting read/write access of circuit breaker settings, comprising:

providing a circuit breaker electronic trip unit, the circuit breaker electronic trip unit having a processor, a memory operably coupled to the processor, a display device operably coupled to the processor and an interface operably coupled to the processor and the display device, the interface having at least a first pushbutton and a second pushbutton;

providing a digit selection portion on the display device, the digital selection portion being operably coupled to the first pushbutton;

providing a password display portion on the display device of the electronic trip unit, the password display portion being operably coupled to the second pushbutton;

wherein the processor is configured to execute a method comprising:

requesting a password on the display device;

receiving the requested password from the interface;

determining if the requested password is valid based on password information stored on the memory; and limiting read/write access of the circuit breaker settings stored on the electronic trip unit when the received password is determined invalid, wherein the circuit breaker settings include settings associated with operation of the electronic trip unit.

2. The method of claim 1, wherein the processor is further configured to compare the received password with a plurality of different passwords contained in the password information and determine if the received password is valid from the plurality of different passwords.

3. The method of claim 1, wherein:

the password information includes a plurality of different password levels; and each password level of the plurality of different password levels is associated with a different level of read/write access of the circuit breaker settings stored on the electronic trip unit.

4. The method of claim 1, wherein limiting read/write access includes one of not allowing read/write access; and
allowing read/write access.

5. The method of claim 1, wherein in response to the determining if the received password is valid, a predetermined number of invalid password receipts results in disabling further password receipt for one of a predetermined amount of time and until entry of an administrative password.

6. The method of claim 5, wherein the predetermined number of invalid password receipts is a user-adjustable setting.

7. The method of claim 5, wherein the predetermined amount of time is a user-adjustable setting.

8. A method of limiting read/write access of circuit breaker settings, comprising:
    transmitting a password to the electronic trip unit of the circuit breaker over a communication interface of the electronic trip unit, and wherein the transmitting a password includes transmitting password information from a two-pushbutton communications device in communication with the communication interface;
    receiving information identifying whether the transmitted password is a valid password from the electronic trip unit; and
    performing one of a read/write access of the circuit breaker settings stored on the electronic trip unit and an indicating no read/write access of the circuit breaker settings stored on the electronic trip unit in response to the received information, wherein the circuit breaker settings include settings associated with operation of the electronic trip unit.

9. The method of claim 8, wherein:
    in response to the received information identifying whether the transmitted password is a valid password; and
    in response to receiving a predetermined number of invalid password transmission attempts, disabling further password transmission attempts for one of a predetermined amount of time and until an administrative password is received.

10. The method of claim 9, wherein the predetermined number of invalid password transmission attempts is a user-adjustable setting.

11. The method of claim 9, wherein the predetermined amount of time is a user-adjustable setting.

12. An electronic trip unit of a circuit breaker with limited read/write access to circuit breaker settings stored thereon, comprising:
    a processor configured to process read/write access requests, wherein the requests include transmission of a password to the processor;
    a communication interface operatively connected to the processor to receive the read/write access requests, wherein the communication interface is a two-pushbutton interface of the electronic trip unit;
    a memory operatively connected to the processor configured to store password information and the circuit breaker settings, wherein the password information includes data pertaining to at least one valid password and wherein the circuit breaker settings include data pertaining to overcurrent trip settings for the circuit breaker and operation of the electronic trip unit; and
    a display device on the electronic trip unit, wherein the display device includes a digit selection portion and a password display portion, wherein a first pushbutton of the two-pushbutton interface is associated with the digit selection portion, wherein a second pushbutton of the two-pushbutton interface is associated with the password display portion, and wherein the two-pushbutton interface provides entry of passwords displayed on the display device.

13. The electronic trip unit of claim 12, wherein:
    the password information includes a plurality of different password levels; and
    each password level of the plurality of different password levels is associated with a different level of read/write access to circuit breaker settings stored on the electronic trip unit.

14. The electronic trip unit of claim 12, wherein a predetermined number of invalid password transmissions results in disabling further password transmissions for one of a predetermined amount of time and transmission of an administrative password.

15. The electronic trip unit of claim 14, wherein the predetermined number of invalid password transmissions is a user-adjustable setting.

16. The electronic trip unit of claim 14, wherein the predetermined amount of time is a user-adjustable setting.

* * * * *